April 1, 1952     O. L. GARRETSON     2,591,060
EXCESS FLOW CONTROL VALVE
Filed March 9, 1946     2 SHEETS—SHEET 1
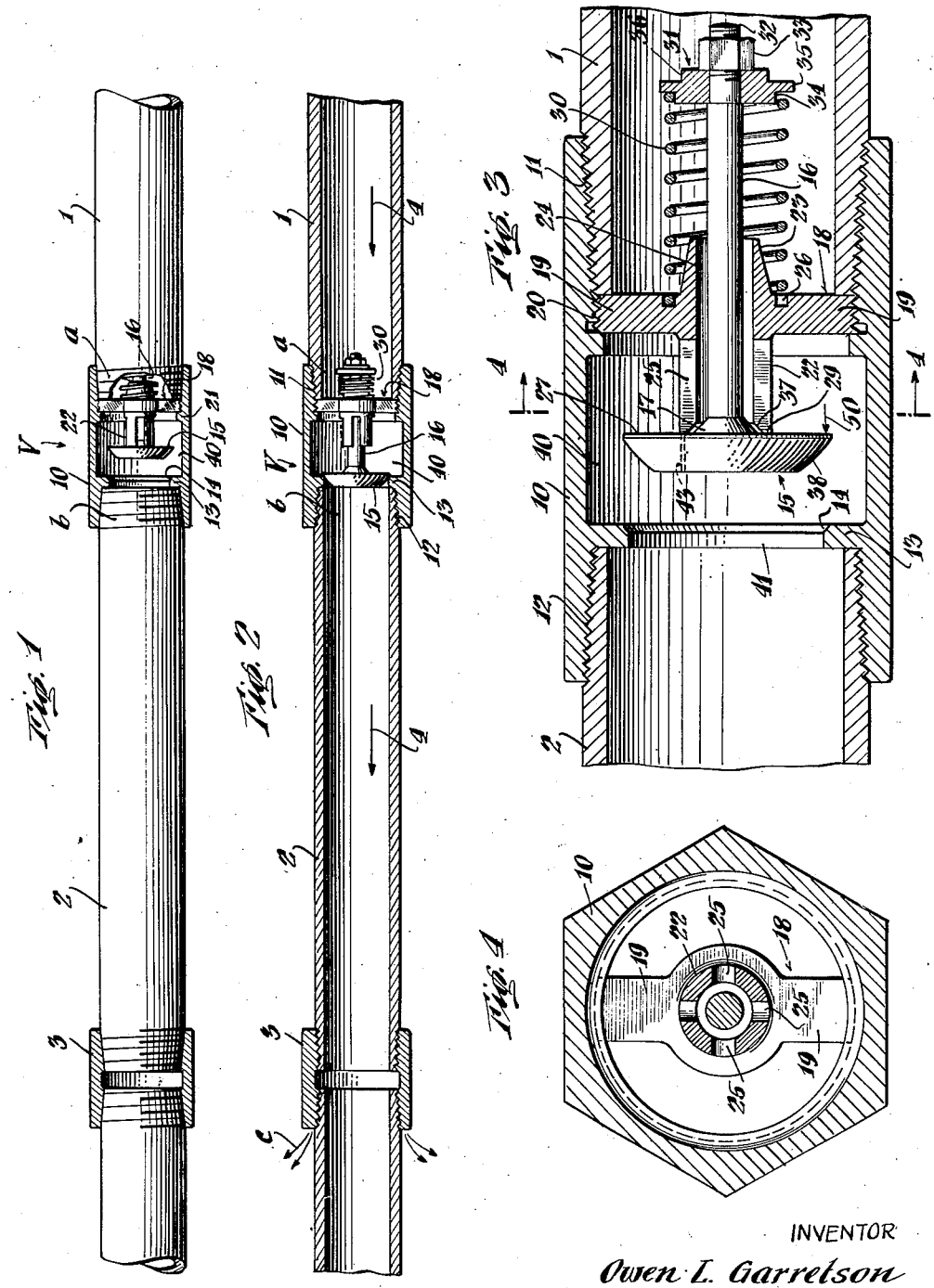
INVENTOR
Owen L. Garretson
BY
Austin, Wilhelm & Carlson
ATTORNEY April 1, 1952     O. L. GARRETSON     2,591,060
EXCESS FLOW CONTROL VALVE
Filed March 9, 1946     2 SHEETS—SHEET 2
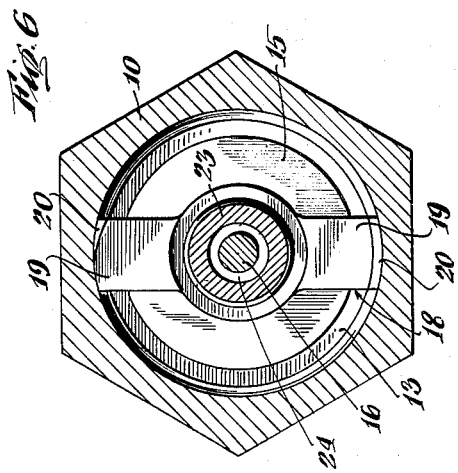
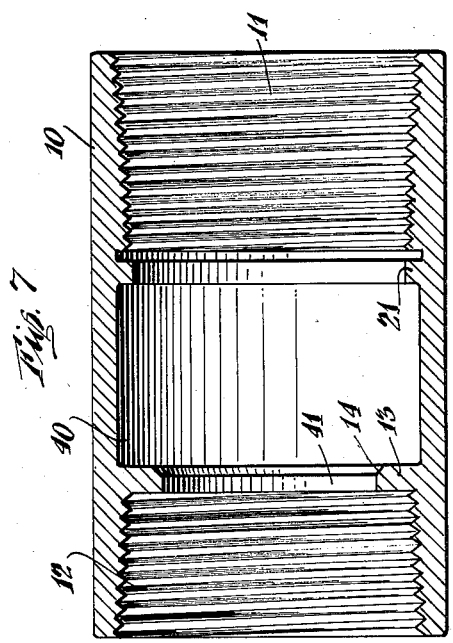
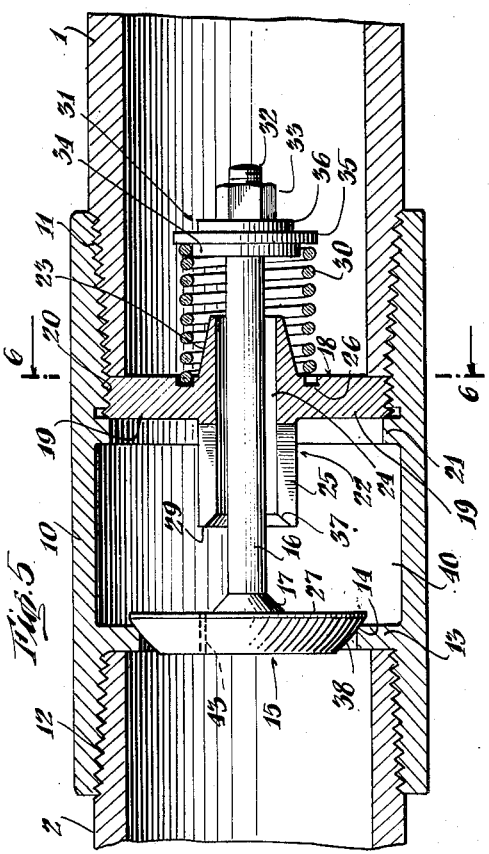
INVENTOR
Owen L. Garretson
BY
Austin, Wilhelm & Carlson
ATTORNEY Patented Apr. 1, 1952

2,591,060

UNITED STATES PATENT OFFICE 2,591,060

EXCESS FLOW CONTROL VALVE

Owen L. Garretson, Bartlesville, Okla., assignor to Phillips Petroleum Company, a corporation of Delaware Application March 9, 1946, Serial No. 653,247

9 Claims. (Cl. 251—127)

This invention relates to an improved excess flow valve assembly which permits free flow of liquids and gases through the conduit system under normal operating conditions but which is automatically operative to cut off the flow when a line leak develops.

In the transportation or transfer of liquids and gases by pipe line or conduit, it is important that means be provided for positively shutting off the flow of the liquid or gaseous materials in the event a line leak develops. This is particularly important when the conduit system carries liquids and gases which create serious explosive, fire or health hazards if permitted to escape through a leak in the system.

Gas and liquid conduit systems are commonly designed to carry the flow under predetermined pressure which remains substantially uniform throughout the conduit system under normal operating conditions. When a leak in the conduit system develops, the established pressure conditions in the system are disturbed, and the resulting pressure drop may be taken advantage of to create a pressure differential across a valve mechanism located in the system in advance of the leakage point.

Excess flow control valves have heretofore been provided which are intended to utilize the principle of pressure differential across the valve mechanism to produce closure or shut-off. However, excess flow control valves presently available have not proven satisfactory either because a pressure differential across the valve mechanism of substantial magnitude is required to effect valve closure, or the valves are not delicately responsive to leak conditions of hazardous magnitude, or the valve parts obstruct or interfere with intended normal flow, or sediment or rust deposit in or around the valve mechanism prevents it from operating in the manner intended. It will be appreciated that under normal operating conditions, excess flow control valves must often be maintained in an opened condition for extended periods of time, providing ample opportunity for sediment and rust deposits to collect around the valve mechanism. Sediment and rust deposits in and around the moving parts of valve mechanisms heretofore provided often cause the valve to stick and become inoperative and indifferent to pressure differential caused by a leak in the line, so that line flow is not closed off when the leak hazard occurs. Serious and damaging explosions and fires, traceable to the failure of presently available excess flow valves to operate when line leakage develops, are of common occurrence.

In accordance with this invention, an improved excess flow valve is provided which is positively and delicately responsive to line leakage of hazardous magnitude. This improved valve will effectively operate when placed in conduit lines extending in either a vertical, horizontal or inclined direction. The valve is so designed that sediment or rust is swept through the valve mechanism by the stream flow and is afforded scant opportunity to deposit in or around the critical moving parts of the valve mechanism. The valve is also so designed that any rust or sediment that might deposit within or on the movable valve part becomes subject to direct tensile strains of a character which the corrosion or sediment accumulation cannot resist when the valve is subjected to a pressure differential resulting from hazardous line leakage. The valve is thus designed so that any sediment or rust deposit cannot cause the valve to stick, and the valve will at all times operate to perform its intended closing function when a line leak develops below the valve location. The valve itself is simple in design construction, comprises few parts and may be economically produced to fit almost any conduit condition encountered.

Other objects and advantages of this invention will become apparent as the disclosure proceeds.

Although the characteristic features of this invention will be particularly pointed out in the claims appended hereto, the invention itself and the manner in which it may be carried out, may be better understood by referring to the following description taken in connection with the accompanying drawings forming a part hereof, in which;

Fig. 1 is a diagrammatic illustration of a pipe line system having this improved excess flow valve incorporated therein, this view illustrating the normal open position of the valve under normal flow conditions.

Fig. 2 is a diagrammatic illustration of the pipe line system showing the excess flow valve in line shut-off position occasioned by line linkage.

Fig. 3 is an enlarged longitudinal cross sectional view of this improved flow control valve as the same appears when in open position.

Fig. 4 is a transverse cross sectional view of the valve as the same appears when viewed in the direction of the arrows indicated by line 4—4 of Fig. 3.

Fig. 5 is an enlarged longitudinal cross sectional view of the flow control valve as the same appears when in closed position.

Fig. 6 is a transverse cross sectional view of the valve as the same appears when viewed along line 6—6 of Fig. 5.

Fig. 7 is a longitudinal cross sectional view of the valve body; and

Fig. 8 is a side view of the valve stem and associated mechanism fully assembled and in position for insertion into the valve body shown in Fig. 7.

Similar reference characters refer to similar parts throughout the several views of the drawings and specification.

There is shown in Figs. 1 and 2 a diagrammatic illustration of the improved flow control valve designated V coupled to an inlet pipe or conduit 1 and outlet pipe or conduit 2, the conduit 2 having for purposes of illustration a connecting coupling 3, the direction of flow through the conduits 1 and 2 being indicated by the arrows 4. Under normal conditions of flow, as indicated in Fig. 1, with no leak in the line, the normal pressure at the entrance end of the valve V indicated as pressure area $a$, will be substantially equal to the pressure at the outlet end of the valve V indicated as pressure area $b$. However, should a hazardous leak in the conduit line 2 develop, as for example a gas leak indicated at $c$ adjacent to coupling 3 as shown in Fig. 2, the exit pressure at area $b$ will be substantially less than the entrance pressure at area $a$, due to the decreased resistance to flow in the outlet conduit 2 as a result of the gas leak $c$. This improved excess flow valve V is so constructed that it will remain open as long as the flow pressure on the entrance side of the valve at area $a$ is substantially equal to the back pressure at the outlet end of the valve at area $b$, the valve operating to shut off the flow into conduit 2 when the back pressure at area $b$ is measurably less than the pressure at the entrance area $a$, a phenomenon which will result from a gas leak at some point below the exit end of the valve V, as for example, gas leak $c$ at coupling 3.

The details of construction of this improved excess flow valve are more particularly illustrated in Figs. 3 to 8 inclusive of the drawings. The valve comprises a valve body 10 of generally tubular form which is internally threaded as at 11 for connection to the externally threaded end of the inlet condit 1 and internally threaded at 12 for attachment to the adjacent externally threaded end of the outlet conduit 2. An internal valve seating shoulder 13 is inwardly formed as part of the valve body 10 and is preferably provided with a spherically shaped valve seat 14 which acts to center and seal with a misaligned valve head when the valve head 15 is spherical. When valve head 15 is conical then seat 14 is preferably conical also and will act to center and seal with such a head even if misaligned. However, in some instances it is sufficient that seat 14 merely be a square shoulder at the top of the cylinder flow passage 41, and such a cylindrical shoulder will act to center the valve head in substantially line contact and seal with either a spherical surface or a conical surface on head 15 even if the head is slightly misaligned. While the remainder of this specification will describe the preferred spherical surfaced valve head 15 and seat 14, it is not intended to limit the invention thereto, but to also protect the use of conical and cylindrical surfaces as set forth in this paragraph.

The valve head 15 is integrally joined to a valve stem 16 by a conical neck portion 17. The valve stem 16 is loosely contained within a valve guide 18 having a pair of radially extending supporting arms 19, the ends of which are threaded at 20 to internal threads provided within the valve body 10. The valve body 10 may be provided with an internal shoulder 21 against which the supporting arms 19 of the valve guide 18 may abut when the supporting arms 19 have been turned into the internally threaded end of the valve body to the proper operating position. The valve guide 18 has a tubular extension 22 formed integrally with the supporting arms 19 and extending axially from the arms 19 in the direction of flow toward the valve head 14. A tapered collar extension 23 formed integrally with the arms 19 extends axially therefrom in the upstream direction. The valve guide has a cylindrical bore 24 substantially larger than the diameter of the valve stem 16, thereby providing an axially extending passage through which the conducted materials may flow. The wall of the tubular extension 22 is provided with a plurality of longitudinally extending slots 25 therein, through which the conducted materials flowing through the enlarged bore passage 24 may escape.

A coil spring 30 telescopes over the valve stem 16 and loosely fits over the collar extension 24 of the valve guide. One end of the coil spring 30 is supported within a groove 26 formed in the arm supports 19 of the valve guide and the other end of the coil spring is supported by a cap member 31 which is threaded over the threaded end 32 of the valve stem 16. A threaded lock-nut 33 is applied to the threaded end 33 of the valve stem 15 to detachably lock the cap member 31 in the desired adjusted position. The cap member 31 has a shoulder portion 34 whose diameter conforms to the internal diameter of the coil spring 30 so as to snugly project into the end thereof. The cap member 31 is provided with a flange 35 against which the adjacent end of the coil spring 30 may abut. The cap member 31 may also be provided with an additional shoulder portion 36 of different diameter than the shoulder portion 34 so that the same cap member 31 may be used in association with coil springs of varying internal diameters.

When the valve head is in normal open position as shown in Fig. 3, the coil spring 30 will retain the upstream face 27 of the valve head 10 in abutment against the flat end 29 of the tubular extension 22 of the valve guide, and the tapered end face 37 thereof will house the conical neck portion 17 of the valve head. Thus the head end of the valve stem 16 is retained in properly centered position within the enlarged bore 24 of the valve guide 18 when the valve head 15 is in normal open position. The opposite end 32 of the valve stem 16 is supported from the supporting arms 19 of the valve guide by the coil spring 30 and the cap member 31 so that the full length of the valve stem 16 is properly centered in the enlarged bore 24 of the valve guide.

The valve head 15 is provided with a spherical seating periphery 38 which corresponds to the spherical seating face 14 associated with the valve seating shoulder 13. Thus tight-seating of the valve head 15 on the valve seat 14 is assured when the valve head is moved by differential pressure into flow shut-off position, as shown in Fig. 5, even though coil spring 30 may not be wholly capable of retaining the valve stem 16 truly centered within the enlarged bore 24 when the conical neck portion 17 has been moved out of its housed position within the end of the tubular extension 22 of the valve guide.

In assembling this improved excess flow valve, the valve stem 16 is telescoped into the enlarged bore 24 of the valve guide 18. The selected coil spring 30 is then telescoped over the valve stem 16 and over the tapered collar extension 23 of the valve guide, care being taken to set the end of the coil spring into the receiving groove 26 of the valve guide arms 19. The cap member 31 is then threaded over the end of the valve stem 16 in a manner so that the selected cap shoulder 34 or 36 will snugly fit within the end of the valve spring 30. The threaded lock-nut 33 is then applied to the threaded end 32 of the valve stem to lock the cap member 31 in the position to which it has been adjusted to produce the desired compression of the coil spring 30. It will be appreciated that the flat end 29 of the tubular extension 22 of the valve guide will then snugly seat against the face 27 of the valve head 15, and the valve stem 16 will be held against play within the enlarged bore 24 by the tapered end face 37 of the tubular extension 22 which seats against the conical neck portion 17 of the valve stem.

The valve assembly is then inserted into the valve body 10 through the intake end thereof and the valve guide 18 is turned into threaded engagement with the internal threads of the valve body until the arm supports 19 of the valve guide abut against the shoulder portion 21 of the valve body. The gaseous or liquid materials are free to flow through the valve body around the radially extending supporting arms 19 and into the valve chamber 40 which contains the valve head 15. The gas or liquid materials are also free to flow through the enlarged bore 24 of the valve guide and escape through the elongated slots 25 therein and into the valve chamber 40. During normal pressure flow through the system, the valve head is held by coil spring 30 in spaced relation to the valve seat 14 so that the gas or liquid materials are free to flow from the valve chamber 40 through the flow passage 41 defined within the valve seat 14 and thence out through the discharge end of the valve body 10.

When differential lowering of the pressure at the valve outlet end of the valve occurs at area b, occasioned by line leak below this point, the greater upstream pressure exerts a pressure force against the upstream face 27 of the valve head 15 as indicated by the arrow 50 which is sufficient to overcome the action of the coil spring 30 and drive the valve head 15 into seating position against the spherical seat 14 of the valve body, thereby stopping flow of gaseous or liquid materials through the valve body. A coil spring 30 is selected of such character as to maintain the valve head 15 in open position under normal pressure and flow conditions but compressible by a pressure differential between areas b and a of a character caused by line leaks of a predetermined hazardous character. A bleed hole 43 may be provided in the valve head 15 to permit a limited seepage of the conducted materials from area a to area b so that when the line leak has been repaired, pressure equilibrium between areas a and b will shortly be restored, so that the valve head may automatically return to its normal off seat position.

This improved excess flow valve assembly is preferably formed of brass, bronze, or metal materials which have a minimum susceptibility to the corrosive action of the liquid or gaseous materials conducted through the system. However a certain amount of sediment and corroded material in the flow must be expected. When this valve is used, sediment or corrosion has no opportunity to deposit within the valve to cause sticking of the valve head and valve stem assembly, since the valve stem is washed by the stream flow through the enlarged bore 24 and the escape slots 25. In normal operation the valve head 15 contacts the valve guide 18 only at the end area 29 and 37 thereof. Rust and sediment which might lodge at this end area would be subjected to a direct tensile strain, rather than a shearing strain, when differential flow pressure is exerted on the valve head 15. While the cementing bond produced by sedimentary and rust deposit is often highly resistant to shearing forces, such bonds are readily broken when subjected to a direct tensile strain. Since the contact area between the end of the valve guide 18 and the valve head 15 is extremely small and is subject to direct tensile strain, a bonding deposit over this area is readily broken by a pressure force applied to the valve head face 28 produced by a pressure differential occasioned by a valve leak of hazardous magnitude.

While the illustrative embodiment shown in the drawings is adapted for use in a flow line or conduit 1, 2, it is obvious that by providing body 10 with suitable connection means (such as external screw threads in place of, or supplementing, threads 12) that body 10 may be attached to the wall of a tank. In such an installation conduit 1 may be used, or omitted, depending upon which point in the tank it is desirable to draw the fluids from. The present improved excess flow valve is therefore adapted to be used in all the usual situations employing such excess flow valves.

While certain novel features of the invention have been disclosed and are pointed out in the annexed claims, it will be understood that various omissions, substitutions and changes may be made by those skilled in the art without departing from the spirit of the invention.

What is claimed is:

1. An improved excess flow control valve for a pressure conduit system which includes, a valve body having a valve seat therein defining a flow passage area extending transversely of the line of flow, a valve head providing a closure for said valve seat, a valve stem extending axially from said valve head, a mounting member supported within said valve body having an enlarged bore through which said valve stem loosely extends, resilient means associated with said mounting member and valve stem operative to resiliently retain said valve head in spaced retracted relation to said valve seat during normal flow conditions but yieldable to permit movement of said valve head to closed position when excess flow conditions are encountered, said valve head having an upstream face extending substantially transversely of the normal stream flow against which pressure may be exerted to advance said closure head in the direction of flow to seating position against the action of said resilient means when a predetermined pressure differential in said valve body develops, the enlarged bore of said mounting member having inflow and outflow openings in the upstream and downstream ends thereof formed to permit free flow of the conducted materials therethrough when said valve head is in retracted position.

2. An improved excess flow control valve for a pressure conduit system which includes, a valve body having a valve seat therein defining a flow passage area extending transversely of the line of flow, a valve head providing a closure for said valve seat, a valve stem extending from said valve head, a mounting member supported within said valve body on the upstream side of said valve seat, said mounting member including a tubular section having an enlarged bore open at both ends thereof through which said valve stem loosely extends, a coil spring associated with said mounting member and valve stem operative to retain said valve head in abutment against the downstream end of said tubular section and in spaced relation to said valve seat during normal flow conditions, said valve head having an upstream face extending substantially transversely of the normal stream flow against which flow pressure may be exerted against the action of said spring to advance said closure head in the direction of flow to seating position when excess flow conditions are encountered, the downstream end of said tubular section having spaced slots in the wall thereof leading from the enlarged bore in said tubular section permitting free flow of the conducted materials therethrough when said valve head is in open position.

3. An improved excess flow control valve for a pressure conduit system which includes, a valve body having a valve seat therein, a valve member contained within said valve body adapted to be moved into and out of seating engagement with said valve seat, said valve member comprising a valve head having an upstream surface area extending substantially transversely of the stream flow and a valve stem extending therefrom in an upstream direction, a valve mounting having a tubular section and spaced arms radiating therefrom secured to the interior surface of said valve body, said tubular section having an enlarged axial bore extending therethrough in the general direction of stream flow and through which said valve stem loosely extends so as to provide an axially extending flow passage between the valve stem and the interior surface of said tubular section, flow escape slots in the downstream end of said tubular section adjacent said valve head, and resilient means operative to retain said valve head in spaced retracted relation to said valve seat during normal flow conditions but yieldable to permit movement of the valve head to closed position when predetermined excess flow conditions are encountered.

4. In an excess flow valve, in combination, a valve seat, a support on the upstream side of said valve seat defining an elongated cylindrical passage, and a valve head assembly normally spaced from said seat, said assembly including a stem mounted within said passage and of substantially smaller diameter than said passage, a helical spring encircling said stem, the ends of said spring being secured to said support and to the upstream end of said stem, respectively, a valve head secured to the downstream end of said stem and normally retained in spaced relation to said valve seat by said helical spring, said valve head having a surface disposed transversely to the direction of fluid flow through said valve, and a tapered portion formed on said stem adjacent said valve head, said tapered portion being of progressively increasing diameter proceeding from a point spaced from said valve head toward the point of attachment of said valve head to said stem, said support having structure formed to guide the tapered portion of said stem to a centered position within said passage.

5. In an excess flow valve, in combination, a valve seat, a support defining an elongated cylindrical passage, and a valve head assembly spaced from said seat, said assembly including a stem mounted within said passage and of substantially smaller diameter than said passage, a collar mounted at one end of said stem, a helical spring encircling said stem, the ends of said spring being secured to said collar and said support, respectively, a valve head secured to the other end of said stem, said valve head having a surface disposed transversely to the direction of fluid flow through said valve, and a tapered portion formed on said stem adjacent said valve head, said tapered portion being of progressively increasing diameter proceeding from a point spaced from said valve head toward the point of attachment of said valve head to said stem, said support being shaped to form a tapered portion complementary to the tapered portion of said stem and of substantially larger diameter throughout its length than said tapered portion of the stem.

6. In an excess flow valve, in combination, a valve seat, a support defining an elongated cylindrical passage having an enlarged frusto-conical portion at one end thereof, and a valve head assembly spaced from said seat, said assembly including a stem mounted within said passage and of substantially smaller diameter than said passage, a collar mounted at one end of said stem, a helical spring encircling said stem, the ends of said spring being secured to said collar and said support, respectively, a valve head secured to the other end of said stem, said valve head having a surface disposed transversely to the direction of fluid flow through said valve, and an enlarged frusto-conical portion formed on said stem adjacent said valve head, said stem portion being complementary to and of smaller diameter than the enlarged frusto-conical portion of said passage, whereby said frusto-conical portions cause proper seating of the valve head upon said support while providing a path for the flow of fluids through the passage between the support and the stem.

7. In an excess flow valve, in combination, a valve seat, a support defining an elongated cylindrical passage, and a valve head assembly spaced from said seat, said assembly including a stem mounted within said passage and of substantially smaller diameter than said passage, a collar mounted at one end of said stem, a helical spring encircling said stem, the ends of said spring being secured to said collar and said support, respectively, a valve head secured to the other end of said stem, said valve head having a surface disposed transversely to the direction of fluid flow through said valve, and an enlarged frusto-conical portion formed on said stem, the base of said portion abutting said valve head, said support being shaped to form an enlarged frusto-conical region at the end of said passage which is complementary with the frusto-conical portion of said stem, the portion of the support defining said region being spaced, throughout its length, from the enlarged frusto-conical portion of said stem, whereby said frusto-conical portions cause proper seating of the valve head against said support and provide a path for the flow of fluid through the passage between said support and said stem.

8. An improved excess flow control valve for a pressure conduit system which includes, a valve body having a valve seat therein, a valve member contained within said body adapted to be moved into and out of seating engagement with said valve seat, said valve member comprising a valve head having an upstream surface extending substantially transversely of the stream flow and a valve stem extending from said valve head in an upstream direction substantially parallel to the stream flow, a valve mounting on the upstream side of said valve seat having a tubular section connected by spaced arms to the valve body, said tubular section having an enlarged bore extending axially therethrough in the general direction of stream flow and through which said valve stem loosely extends so as to provide an axially extending flow passage between the valve stem and the interior surface of said tubular section, said tubular section having a tubular portion extending in an upstream direction from said valve mounting arms, a helical spring having one end thereof supported by said mounting and telescoped over said tubular portion, the other end of said spring being connected to the upstream end of said valve stem, and means for limiting the retracted portion of said valve head, the enlarged bore of said tubular section having inflow and outflow openings in the upstream and downstream ends thereof to permit free flow of the conducted material therethrouh when said valve head is in retracted position as defined by said limiting means, said helical spring being operative to normally retain said valve head in retracted position and in spaced upstream relation to said valve seat during normal flow conditions but yieldable to permit movement of the closure head to closed position when predetermined excess flow conditions are encountered.

9. An improved excess flow control valve for a pressure conduit system which includes, a valve body having a valve seat within the valve body, a valve member contained within said valve body adapted to be moved into and out of seating engagement with said valve seat, said valve member comprising a valve head having an upstream surface area extending substantially transversely of the stream flow and a valve stem connected to said valve head and extending upstream therefrom, said valve stem having an enlarged tapered neck section adjacent said valve head, a valve mounting having a tubular section on the upstream side of said valve seat and supported within said valve body, said tubular section having an enlarged bore through which said valve stem loosely extends so as to provide an axially extending flow passage between the valve stem and the interior surface of said tubular section, said tubular section having an end portion formed to guide the tapered neck section of said stem to a centered position within said passage, and resilient means operative to retain said tapered neck section in abutment against said end portion of the tubular section with said valve stem centered in said axial bore during normal flow conditions.

OWEN L. GARRETSON.

REFERENCES CITED

The following references are of record in the file of this patent:

UNITED STATES PATENTS

| Number | Name | Date |
|---|---|---|
| 586,561 | Mosher | July 20, 1897 |
| 653,860 | Buckley | July 17, 1900 |
| 821,859 | Clegg | May 29, 1906 |
| 1,060,142 | Stevens | Apr. 29, 1913 |
| 1,718,644 | Gilbert | June 25, 1929 |
| 1,873,361 | Ackerman | Sept. 20, 1932 |
| 1,896,673 | Kopsa | Feb. 7, 1933 |
| 2,177,779 | McDonald | Oct. 31, 1939 |
| 2,357,321 | Fuller | Sept. 5, 1944 |

FOREIGN PATENTS

| Number | Country | Date |
|---|---|---|
| 465,315 | France | of 1914 |